(12) United States Patent
Eerola (10) Patent No.: US 7,136,925 B1
(45) Date of Patent: Nov. 14, 2006

(54) SYSTEM FOR PROCESSING WIRELESS CONNECTIONS USING CONNECTION HANDLES

(75) Inventor: Severi Eerola, Pirkkala (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/979,297

(22) PCT Filed: May 22, 2000

(86) PCT No.: PCT/FI00/00460

§ 371 (c)(1),
(2), (4) Date: Nov. 20, 2001

(87) PCT Pub. No.: WO00/72545

PCT Pub. Date: Nov. 30, 2000

(30) Foreign Application Priority Data

May 24, 1999 (FI) .................................. 991179

(51) Int. Cl.
*G06F 15/16* (2006.01)
(52) U.S. Cl. .................. 709/228; 709/226; 709/224; 709/225
(58) Field of Classification Search ............... 709/225, 709/227, 229, 223, 224, 228; 455/3.01, 426; 370/230
See application file for complete search history.

(56) References Cited

U.S. PATENT DOCUMENTS

| | | | | |
|---|---|---|---|---|
| 4,977,612 A | * | 12/1990 | Wilson ..................... | 455/166.1 |
| 5,230,082 A | * | 7/1993 | Ghisler et al. ............. | 455/438 |
| 5,276,911 A | * | 1/1994 | Levine et al. .............. | 455/510 |
| 5,321,841 A | * | 6/1994 | East et al. .................. | 718/107 |
| 5,406,643 A | * | 4/1995 | Burke et al. ............... | 709/243 |
| 5,490,139 A | * | 2/1996 | Baker et al. ............... | 370/312 |
| 5,649,103 A | * | 7/1997 | Datta et al. ................. | 709/203 |
| 5,655,134 A | * | 8/1997 | Yamazaki .................. | 712/1 |
| 5,732,076 A | * | 3/1998 | Ketseoglou et al. ........ | 370/347 |
| 5,844,899 A | * | 12/1998 | Daley et al. ............... | 370/342 |

(Continued)

FOREIGN PATENT DOCUMENTS

WO  WO 99/25148  * 5/1999

(Continued)

OTHER PUBLICATIONS

"WAP White Paper", retrieved from the Internet, 1999, pp. 1-22.

(Continued)

*Primary Examiner*—William C. Vaughn, Jr.
*Assistant Examiner*—Greg Bengzon
(74) *Attorney, Agent, or Firm*—Perman & Green, LLP (57) ABSTRACT

The present invention relates to a method for controlling connections in the gateway of a wireless system, such as the WAP system, which gateway comprises means for implementing the protocol layers. The method is characterized in that it assigns a connection handle to each connection upon the establishment of the connection, in order to identify the connection, maintains a reference count for each connection on the basis of certain conditions that pertain to the connection handle in order to control the connections, increases the value of the reference count of the connection by one unit upon the creation of a protocol object for the connection handle, reduces the value of the reference count of the connection by one unit upon the elimination of the protocol object created for the connection, and releases the connection, and the connection handle which is related to this connection, when the reference count of the connection receives the value zero. The said invention also relates to the said gateway, a computer program which is connected with the method, and a memory in which the computer program is located.

18 Claims, 4 Drawing Sheets

U.S. PATENT DOCUMENTS

| | | | | |
|---|---|---|---|---|
| 5,987,018 | A * | 11/1999 | Freeburg et al. | 370/310.2 |
| H001836 | H * | 2/2000 | Fletcher et al. | 455/433 |
| 6,049,828 | A * | 4/2000 | Dev et al. | 709/224 |
| 6,092,111 | A * | 7/2000 | Scivier et al. | 709/227 |
| 6,125,398 | A * | 9/2000 | Mirashrafi et al. | 709/236 |
| 6,212,164 | B1 * | 4/2001 | Murakami et al. | 370/230 |
| 6,229,809 | B1 * | 5/2001 | Murphy et al. | 370/401 |
| 6,246,669 | B1 * | 6/2001 | Chevalier et al. | 370/238 |
| 6,256,498 | B1 * | 7/2001 | Ludwig | 455/433 |
| 6,269,402 | B1 * | 7/2001 | Lin et al. | 709/227 |
| 6,275,889 | B1 * | 8/2001 | Saito | 710/313 |
| 6,317,831 | B1 * | 11/2001 | King | 713/171 |
| 6,330,448 | B1 * | 12/2001 | Otsuka et al. | 455/436 |
| 6,377,799 | B1 * | 4/2002 | Hameleers et al. | 455/422.1 |
| 6,377,955 | B1 * | 4/2002 | Hartmann et al. | 707/104.1 |
| 6,430,413 | B1 * | 8/2002 | Wedi et al. | 455/442 |
| 6,434,117 | B1 * | 8/2002 | Momona | 370/236 |
| 6,442,608 | B1 * | 8/2002 | Knight et al. | 709/225 |
| 6,456,843 | B1 * | 9/2002 | Daly | 455/419 |
| 6,477,373 | B1 * | 11/2002 | Rappaport et al. | 455/436 |
| 6,477,581 | B1 * | 11/2002 | Carpenter et al. | 709/238 |
| 6,490,291 | B1 * | 12/2002 | Lee et al. | 370/401 |
| 6,496,867 | B1 * | 12/2002 | Beser et al. | 709/245 |
| 6,507,567 | B1 * | 1/2003 | Willars | 370/321 |
| 6,539,432 | B1 * | 3/2003 | Taguchi et al. | 709/227 |
| 6,546,425 | B1 * | 4/2003 | Hanson et al. | 709/227 |
| 6,598,080 | B1 * | 7/2003 | Nagami et al. | 709/227 |
| 6,674,713 | B1 * | 1/2004 | Berg et al. | 370/217 |
| 6,918,005 | B1 * | 7/2005 | Marchant et al. | 711/113 |
| 2003/0202515 | A1 * | 10/2003 | Ikeda et al. | 370/395.1 |

FOREIGN PATENT DOCUMENTS

WO    WO 00/20993    4/2000

OTHER PUBLICATIONS

"4K Associates", W★ Effect Considered Harmful, retrieved from the Internet, pp. 1-30.

* cited by examiner

SYSTEM FOR PROCESSING WIRELESS CONNECTIONS USING CONNECTION HANDLES

This application claims the benefit of the earlier filed International Application No. PCT/FI00/00460, International Filing Date, May 22, 2000, which designated the United States of America, and which international application was published under PCT Article 21(2) in English as WO Publication No. WO 00/72545 A1.

BACKGROUND OF THE INVENTION

The present invention relates to wireless data transmission, in particular to the processing of connections in the gateway of the WAP system (Wireless Application Protocol) and of other similar wireless systems.

Wireless communication networks and the Internet network are expanding rapidly and the number of persons using these is also on the increase. The importing of Internet contents and sophisticated data services in digital mobile stations, so-called media telephones, can be implemented using the WAP technology or Nokia's Smart Messaging technology, for example. Although the example referred to below concerns the WAP system, this presentation also applies to other similar systems (Nokia Smart Messaging etc.), which are used to import Internet contents in wireless terminals. Contents that conform to the WAP technology and that have been imported in wireless terminals are generally known as the WAP content. The WAP technology utilises parts of the existing standards. In addition, it comprises own solutions optimised for use with wireless networks. The aim is to support a maximally large number of wireless digital telecommunication networks on a global scale. As the WAP system was developed only recently and as the specifications of the said system in some cases only define the framework for different types of implementation, no solutions are known to exist for implementing certain parts of the system.

Figure 1:
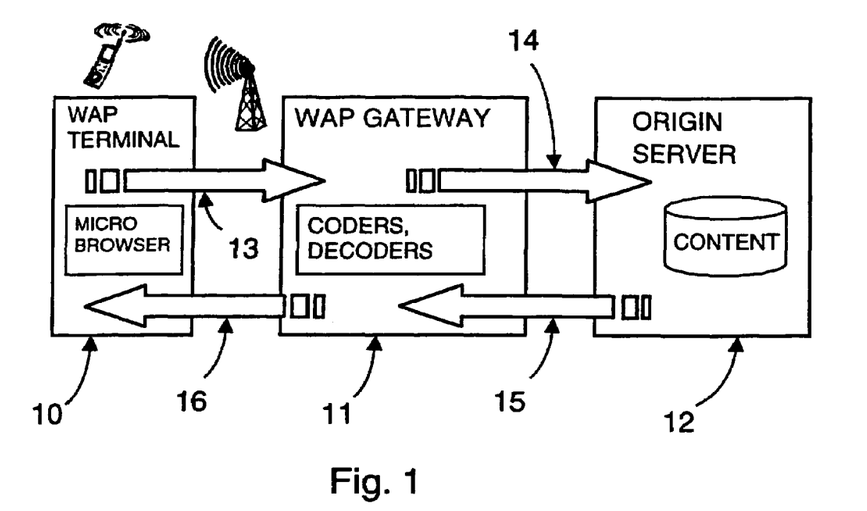
FIG. 1 presents a model of the WAP system.

The WAP system is based on the joint operation of three components, that is, the WAP terminal 10, the WAP gateway and the origin server 12 (FIG. 1). Correspondingly, the Nokia Smart Messaging centre comprises a gateway between the terminal and the origin server, one of the product versions of the said gateway being termed Nokia Artus Messaging Platform. To browse WAP contents, the user has access to the wireless WAP terminal 10 which comprises a WAP browser as the user interface, a micro browser, or some other WAP application that can be used in a WAP terminal. The said WAP terminal can be any appliance, which uses the WAP protocol for external communications. The WAP browser is analogous with the web browser.

When the user wants to receive a certain WAP content to his terminal, an effectively encoded request 13 first moves through the radio path to the WAP gateway 11. The said gateway, which comprises coders and decoders, is capable of converting information that conforms to the WAP protocol, such as a WSP (Wireless Session Protocol), to information that conforms to the Internet protocol, such as the HTTP protocol (HyperText Transfer Protocol), and vice versa. Once the gateway receives the aforementioned request from the WAP terminal, it converts it to the request 14, which conforms to the Internet protocol, and sends it to the origin server 12 in which the desired WAP content is located.

The WAP content 15, which is obtained from the origin server as a response to the above request and which can be a WML document (Wireless Markup Language) or WML script document, is sent to the WAP gateway 11 which converts the information that conforms to the Internet protocol to information that conforms to the WAP protocol, such as the WSP protocol. Correspondingly, a HTML document (Hyper Text Markup Language), for example, is converted to a TTML document (Tagged Text Markup Language) in the gateway of the Nokia Smart Messaging system. Next, the gateway 11 sends the WAP content 16, which is effectively coded for the radio path, to the WAP terminal 10. It should be noted that there are typically a number of elements between the WAP gateway and the radio interface in the GSM network (Global System for Mobile communication), for example. The said elements are usually appliances which are located in a mobile services switching centre, a base station controller or a base transceiver station. In the GSM network, the WAP gateway can be connected to the mobile services switching centre or a short message service centre. The WAP gateway can be perceived as being functionally coupled with the radio interface.

Figure 2:
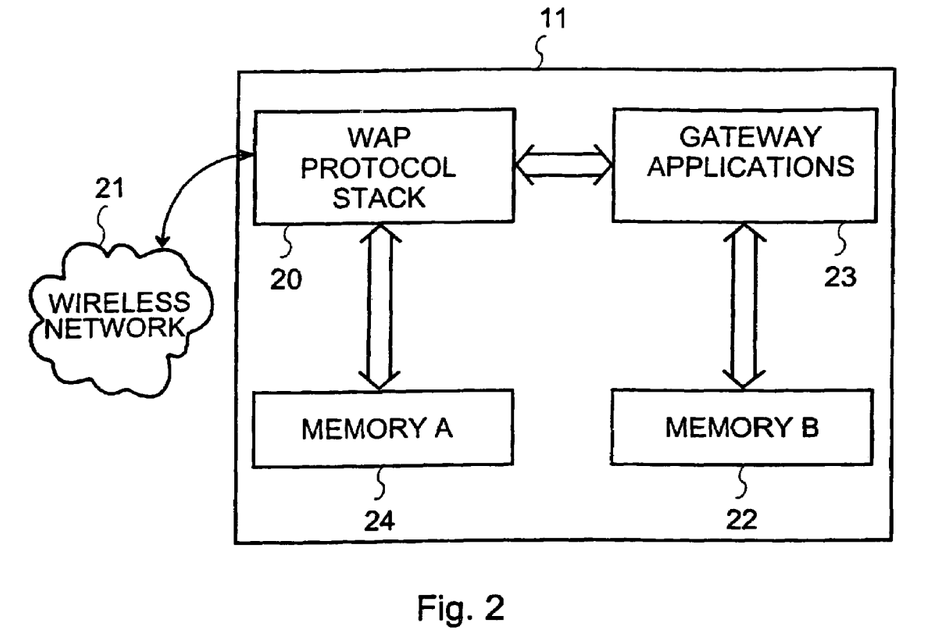
FIG. 2 presents a block diagram of the WAP gateway.

The block diagram of the WAP gateway 11 is shown in FIG. 2. The gateway comprises the WAP protocol stack 20 which comprises hierarchical WAP protocol layers of which the lowermost WDP layer (Wireless Datagram Protocol) communicates with the wireless network 21. In addition, the gateway comprises the gateway applications 23 in which the requests obtained from the WAP protocol layers and the responses received from the origin servers are processed. The gateway applications normally use a different memory (MEMORY B) 22 than does the WAP protocol stack 20, the memory (MEMORY A) 24 of which contains separate storage blocks reserved for use by different protocol layers.

Physically the gateway can be located in the information network of a telecommunications company. One telecommunications company typically only has one or several WAP gateways each of which serves a large number of customers who utilise WAP services.

Each WAP terminal application typically has at least one session with the WAP gateway, which session should be known to the WAP gateway, that is, stored in its ROM or RAM. The session denotes here communication-related shared information known to both the connection parties, here, the WAP terminal and the WAP gateway. The initiative for opening the session is obtained from the WAP terminal, which terminal typically also launches an initiative for terminating the session. As there may be more than one million sessions to one WAP gateway simultaneously, the problem is the ability of the gateway to handle the enormous quantity of requests, which are obtained from terminals, without becoming jammed. There may be a number of requests during one session.

Figure 3:
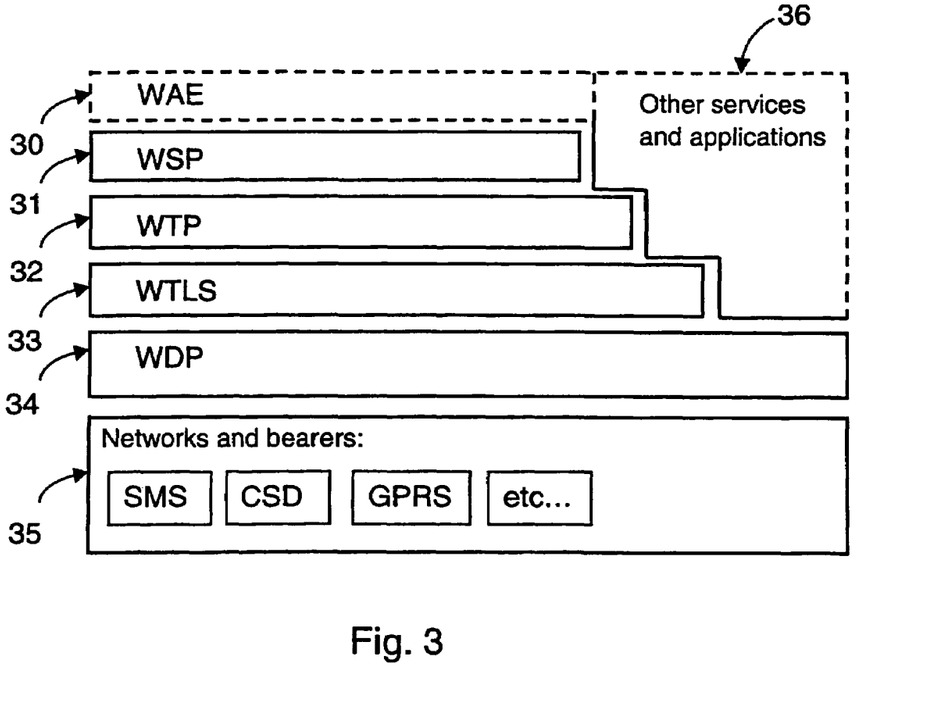
FIG. 3 presents the layers of a hierarchical WAP architecture.

As for its protocols, the WAP system is hierarchical (FIG. 3). The protocol comprises information on the forms of data transmission and on the rules that govern traffic and behaviour in data transmission.

The uppermost layer, the WAE layer 30 (Wireless Application Environment), is not actually a WAP protocol layer, but a broad application environment which is based on WWW (World Wide Web) and mobile station technologies. Below the said WAE layer in the hierarchy lies the uppermost actual protocol layer of the WAP protocol stack, the WSP (Wireless Session Protocol, which comprises session-related services connected with making browser application requests, for example.

The WTP 32 (Wireless Transaction Protocol) below the WSP layer is responsible for reliable data transmission, for example. The WTLS layer 33 (Wireless Transport Layer Security) below the WTP layer contains optional services which are connected with the safety of data communications and which the various applications can choose. The lowermost protocol layer, the WDP layer 34 (Wireless Datagram Protocol), in the WAP protocol stack acts above the bearers intended for information transmission in each network, such as the GSM network or the CDMA network (Code Division Multiple Access). Bearers of this kind include short messages (SMS, Short Message Services), data calls (CSD, Circuit Switched Data), packet radio services (GPRS, General Packet Radio Service) and other bearers, which are defined in the WAP specifications. Bearers are occasionally also called data carriers (bearers) or trails.

The services and applications 36 that utilise the WAP protocol stack do not necessarily have to use all the protocol layers. Thus an application can, for example, only utilise the lowermost WDP layer through a well-defined interface.

Figure 4:
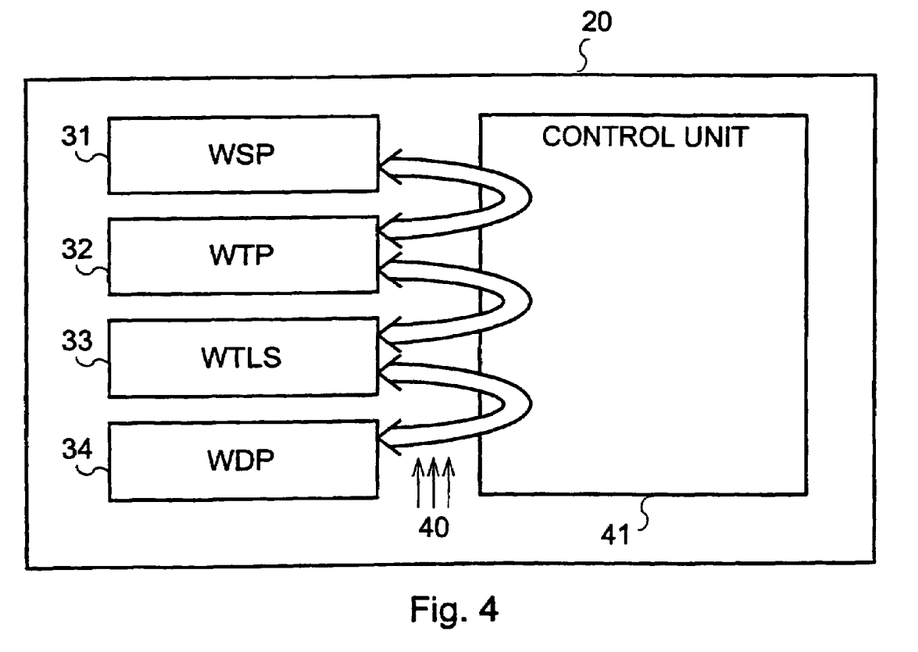
FIG. 4 presents the organisation of the flow of information between the WAP layers

The WAP layers in the WAP gateway implementation are parts of a computer program, which is stored in the memory of the gateway. Communication between the layers takes place through the protocol messages 40 (FIG. 4). Typically the upper layer uses the services of the lower layer. The request usually moves in the WAP gateway between layers 31–34 in the protocol stack from down to up, whereas the response moves in the opposite direction. Traffic between the protocol layers is controlled and administered by the control unit 41 (broker).

According to WAP specifications, the messages that move inside the WAP system should refer to the address data of the connection concerned. In other words, e.g. a protocol message which moves between the WAP layers should contain connection address data so that when the said message enters a protocol level, these address data are stored in the said protocol layer. Such keeping of the address data in the WAP layers is a waste of resources, however, which in practise requires a large memory capacity and expensive hardware.

SUMMARY OF THE INVENTION

Now, an invention has been made for intensifying communication between the WAP layers and the WAP protocol stack and between gateway applications.

According to the invention there is provided a method for controlling connections in a gateway which is functionally coupled with a radio interface and which gateway comprises means for implementing a certain protocol layer. It is characteristic of the method that in the method a connection handle is assigned to each connection upon the establishment of the connection, in order to identify the connection, a reference count is maintained for each connection in order to control the connections, on the basis of certain conditions that pertain to the connection handle, the value of the connection reference count is increased by one unit upon the realisation of a first condition, the value of the connection reference count is reduced by one unit upon the realisation of a second condition, the connection and the related connection handle are released upon the realisation of a third condition that pertains to the reference count.

According to the invention there is provided a gateway which is functionally coupled with a radio interface and which is intended for transmitting messages between a wireless terminal and a server, which gateway comprises a protocol layer for processing messages. It is characteristic of the gateway that it comprises means for assigning a connection handle to each connection upon the establishment of the connection, in order to identify the connection, means for maintaining a reference count for each connection in order to control the connections on the basis of certain conditions that pertain to the connection handle, means for increasing the value of the connection reference count by one unit upon the realisation of a first condition, means for reducing the value of the connection reference count by one unit upon the realisation of a second condition, means for releasing the connection and the related connection handle upon the realisation of a third condition that pertains to the reference count.

According to the invention there is provided a computer program product, executable using a computer, for controlling connections in a gateway which is functionally coupled with a radio interface and which gateway comprises means for implementing a certain protocol layer. It is characteristic of the computer program product that it comprises means for assigning a connection handle to each connection upon the establishment of the connection, in order to identify the connection, means for maintaining a reference count for each connection in order to control the connections on the basis of certain conditions that pertain to the connection handle, means for increasing the value of the connection reference count by one unit upon the realisation of a first condition, means for reducing the value of the connection reference count by one unit upon the realisation of a second condition, means for releasing the connection and the related connection handle upon the realisation of a third condition that pertains to the reference count.

According to the invention there is provided a memory readable by means of a computer, in which memory a computer program has been stored for controlling connections in a gateway, which gateway is functionally coupled with a radio interface and which gateway comprises means for implementing a certain protocol layer. It is characteristic of the memory that upon execution of the computer program, a connection handle is assigned to each connection upon the establishment of the connection, in order to identify the connection, a reference count is maintained for each connection in order to control the connections on the basis of certain conditions that pertain to the connection handle, the value of the connection reference count is increased by one unit upon the realisation of a first condition, the value of the connection reference count is reduced by one unit upon the realisation of a second condition, the connection and the related connection handle are released upon the realisation of a third condition that pertains to the reference count.

The invention enables the aforementioned drawbacks to be avoided by assigning, in a computer program connected with the WAP gateway, a connection handle to each connection in order to identify the connections, which connection handle is a numerical connection-specific value in the WAP protocol stack. The administration and control of the connection handles is implemented in a centralised manner through a connection handle manager that is contained in a control unit, which connection handle manager assigns a connection handle to each new connection and stores the said assigned connection handle in its memory. The connection handle manager also contains full information on each connection that corresponds to each connection handle, and the value of the reference count which indicates how many WAP protocol layer protocol objects and gateway applications are using the said connection.

In the WAP protocol stack, the connection handle specific to each connection is sent with the protocol message, which travels from one protocol layer to another, to identify a connection with which the said protocol message is connected. When creating protocol objects, the connection handle is stored in the storage block utilised by the layer by which the said protocol object was created. Information on the creation and elimination of protocol objects is sent to the connection handle manager. The use of the connection handle allows for saving resources, for there is no longer any need for referring to full space-consuming address information in the WAP protocol stack. Furthermore, the use of the said connection handle also allows for avoiding the time-consuming processing and testing of gateway applications before connecting a new bearer to the WAP protocol stack, since the application according to the invention typically does not know full connection data, e.g. the bearer used, but only knows the connection handle assigned to the connection.

In the following, the invention will be described in detail by referring to the enclosed drawings, in which.

DESCRIPTION OF THE DRAWING

DETAILED DESCRIPTION OF THE INVENTION

In the first preferable form of execution (FIG. 5), according to the invention, datagram 58 arrives from the telecommunication network 50 in some bearer which is supported by the WAP system, at the WDP layer 34, which is the lowermost layer in the WAP protocol stack. The said datagram can be a request, or part of it, sent from the WAP terminal for retrieving train timetable data from the origin server to the WAP terminal. The bearer can be an SMS service in the GSM network in which case the said arriving datagram would be a GSM short message.

Figure 5:
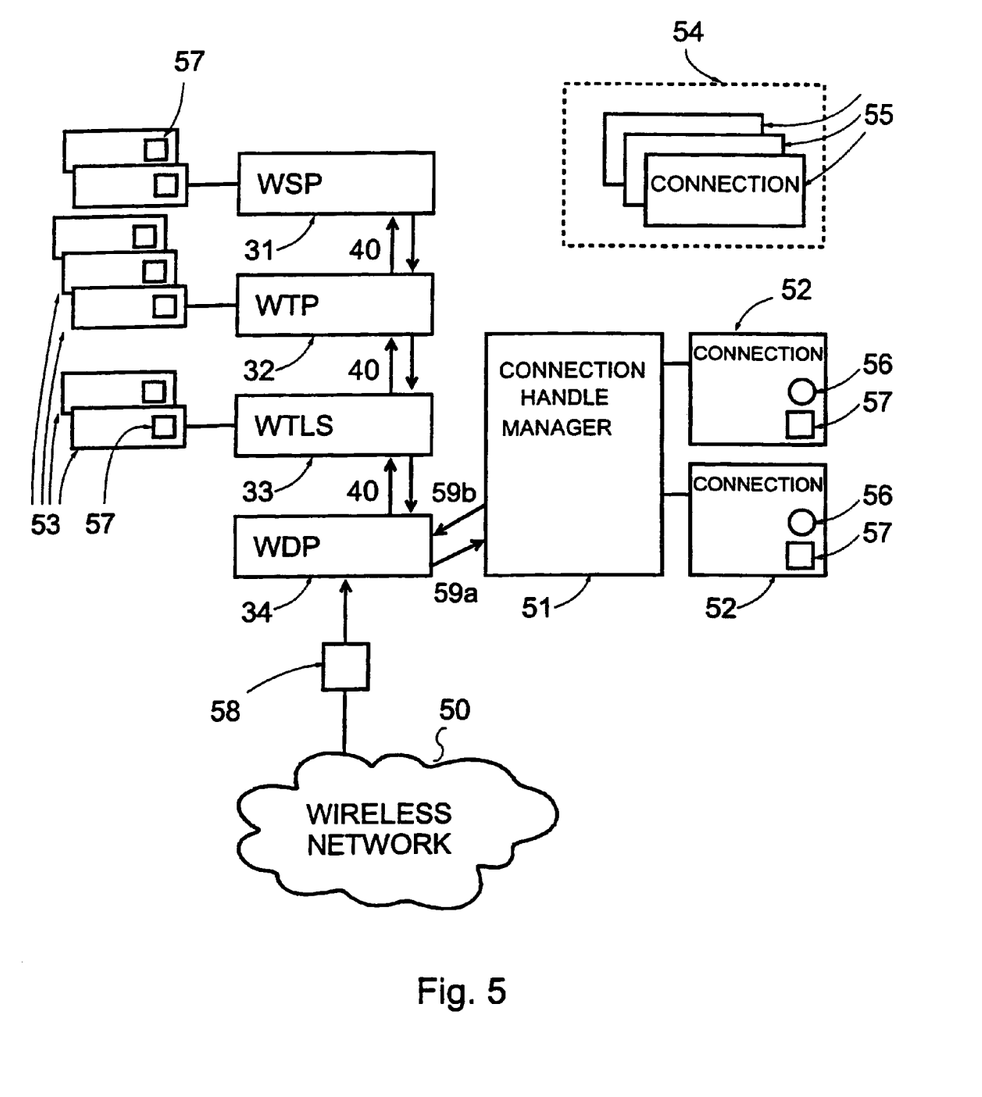
FIG. 5 presents the assembly of a preferable form of execution, according to the invention.

The datagram 58 comprises the sender's address (remote address), the application address as a remote port number, the receiver's address (local address), the application address in the form of a local port number and the information to be transmitted. The address data can be composed of telephone numbers or IP numbers (Internet Protocol). The application address determines the application for which the datagram is intended.

The connection data are maintained in a centralised manner in the connection handle manager 51 which is part of the control unit 41. Each connection 52 comprises information on the sender's address (remote address), the sender's application address (remote port number), the receiver's address (local address) and the receiver's application address (local port number), the WAP layers (stack configuration) used and the bearer employed. The connection handle manager also contains, specific to each connection, the value of the reference count 56 which indicates how many WAP protocol layer protocol objects 53 and gateway applications are using the said connection. To identify the connections, the connection handle manager 41 assigns to each connection and stores in its memory 23 the connection handle 57 which is a numeric value, preferably an integer, which is intended for use by the WAP protocol stack and which pertains to each connection. Protocol object 53 denotes the information maintained by a protocol layer for each basic protocol operation.

As the datagram 58 reaches the WDP layer 34, the said layer asks, through the subroutine call 59a, from the connection handle manager 51 for the connection handle 57, after which the connection handle manager checks from its memory 24 whether there is already a valid connection 52 in the WAP terminal by which the datagram was sent.

If there is a valid connection 52 in the WAP terminal by which the said datagram was sent, the connection handle manager 51 will send the connection handle 57 of the said connection 52 to the WDP layer 34 as a response 59b to the subroutine call 59a. If no valid connection exists for the connection information contained in the said datagram, the connection handle manager will retrieve from the connection pool 54 in its memory 24 a free connection 55 and store in it all connection information and the connection handle 57 that it has assigned to the connection (in which case, as presented in FIG. 5, the free connection 55 will change into connection 52). As a response 59b to the subroutine call 59a, the connection handle 57 assigned to the said connection 52 is sent even in this case. The free connection 55 here denotes a memory space which has not been assigned for use by any existing connection 52.

The information contained in the datagram now moving, through the protocol messages 40, from one protocol layer to another in the WAP protocol stack and further to the gateway applications, these protocol messages also carry the connection handle 57 assigned by the connection handle manager to the connection so as to identify that particular connection. Full information on the connection, which corresponds to the connection handle, including address data, are known to the connection handle manager in a centralised manner and are not sent as part of the protocol messages.

When a protocol message that contains connection handle 57 arrives at the protocol layer 31–34 and a new protocol object 53, which is specific to protocol layer, is created, the connection handle is always stored in the said protocol object, that is, in the storage block reserved in memory 24 for the relevant protocol layer. The said protocol layer sends information on this to the connection handle manager 51 which increases by one the value of the reference count 56 for the connection 52, which is connected with the connection handle 57.

When the protocol layer 31–34 eliminates a certain protocol object, the said layer informs the connection handle manager 51 of this, which connection handle manager reduces by one the reference count value 56 for the connection 52, which is connected with the said connection handle 57. Each protocol layer 31–34 informs, through subroutine calls, the connection handle manager 51 of changes in the protocol objects 53. If the reference count for any connection 52 receives the value zero, the connection identified by the connection handle 57 will be transferred to free connections 55 in the connection pool 54, for use in some other connection.

If the user of the WAP terminal does not use the terminal, the connection handle connected with this connection can thus be released for use by some other connection. If the same user resumes the use of the same connection, the aforementioned connection handle will be given as the label for the said connection, provided that the connection handle is free. If this is not the case, some other connection handle will be assigned to the connection instead.

Figure 6:
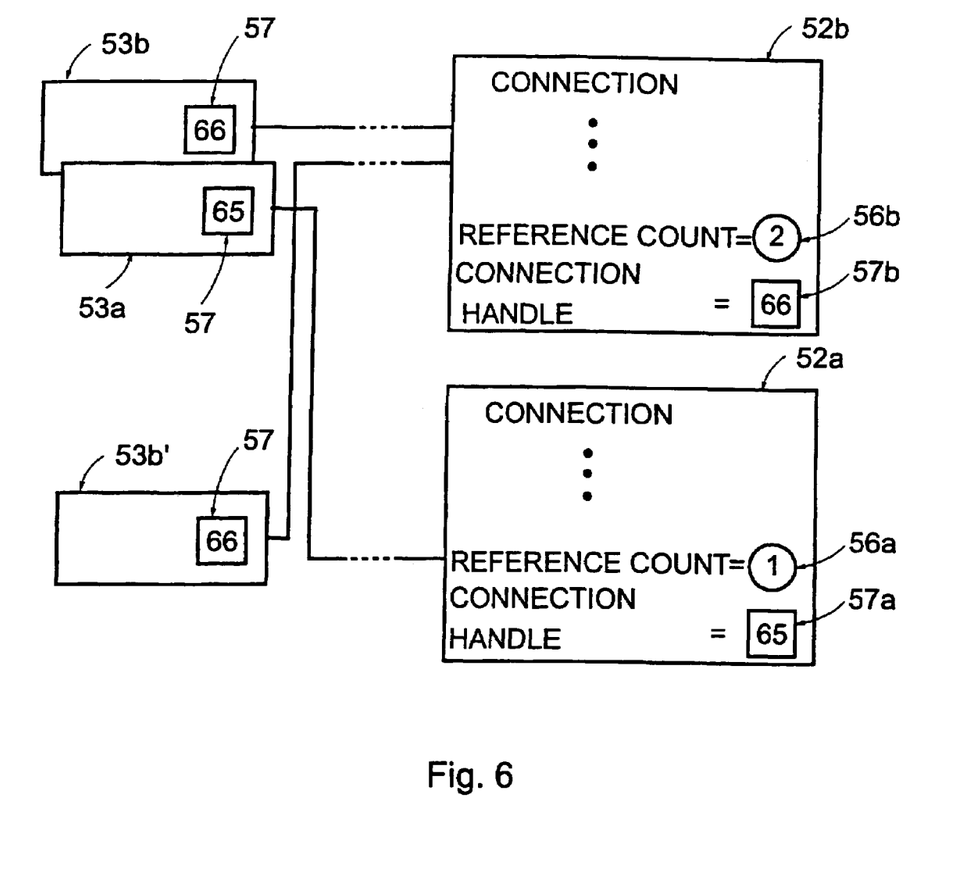
FIG. 6 presents a simplified example of the use of the connection handle and the reference count.

The use of connection handles 57 and reference counts 56 in a hypothetical situation is illustrated in FIG. 6. Let us assume that the first connection in the memory of the connection handle manager was 52a and the second connection 52b, the connection handles 57a and 57b of which are indicated by FIGS. 65 and 66, respectively. Let us also assume that one WAP protocol layer contains the first protocol object 53a, the connection handle stored in which is indicated by FIG. 65, which thus refers to the said first connection 52a, and the second protocol object 53b, the connection handle stored in which is indicated by FIG. 66, which thus refers to the said second connection 52b. Finally, let us assume that, in some other protocol layer, there is a third protocol object 53b the connection handle stored in which is indicated by FIG. 66, which thus refers to the said second connection 52b. As indicated by the information presented here, the value 56a of the reference count of the said first connection 52a is 1, for one protocol object 53a of the WAP protocol layer is used for the first connection. The value 56b of the reference count of the said second connection 52b is 2, respectively.

In the WAP system and other systems that utilise a layered protocol, the corresponding protocol layers of the connection parties communicate with each other. Thus, for example, the protocol object 53, which was created by the WTP layer 32, is a transaction which takes place between the WTP layers of the WAP terminal 10 and the WAP gateway 11. The WTP layer transaction can be created and eliminated in the following manner, for example: the protocol message 40 arrives at the WTP layer 32 from the WSP layer 31, which message requests the WTP layer to create a new transaction 53. The WTP layer 32 creates the new transaction (protocol object) and stores in its memory the connection handle 57, which is connected with the said connection 52, sends to the connection handle manager 51 information on the creation of the transaction, which connection handle manager increases by one the value 56 of the reference count of the said connection.

In a situation where a gateway application requires information on the connection identified by the connection handle, the said gateway application can send a request of this to the connection handle manager from which it then obtains, as a response, the necessary information.

The gateway according to the invention can be implemented by means of software. The relevant computer program product can be stored in a data medium, such as a memory, transferred and run in a computer.

The present invention offers a number of advantages. The invention helps the gateway in processing a large number of sessions without keeping one large number of connections occupied. The operation of the WAP gateway becomes more effective in that resources, such as memory and processor time, are saved when only the connection handle, not all information on the relevant connection, is stored in the protocol messages and protocol layers. In addition, the implementation of the WAP protocol layers is facilitated, for the WAP layers and address data can be kept separate. Not all the layers have to know how to process the address data the form of which depends on the bearer employed. Furthermore, it is now easy to add new information, such as time data, to the connection without changing the properties of the protocol layers. A further advantage is that it is now also possible, for example, to retrieve a session or some other protocol object, which corresponds to the address data, on the basis of the connection handle, which improves performance in that it is simpler to compare the mere number, i.e. the connection handle, than addresses, for example.

The paper presents the implementation and embodiments of the present invention with the help of examples. A person skilled in the art will appreciate that the present invention is not restricted to details of the embodiments presented above, and that the invention can also be implemented in another form without deviating from the characteristics of the invention. The embodiments presented above should be considered illustrative, but not restricting. Thus, the possibilities of implementing and using the invention are only restricted by the enclosed claims. Consequently, the various options of implementing the invention as determined by the claims, including the equivalent implementations, also belong to the scope of the invention.

The invention claimed is:

1. In a gateway, functionally coupled with a radio interface, and having means for implementing a certain protocol layer, a method for controlling connections comprising the steps of:
assigning a connection handle for each connection upon establishment of the connection, in order to identify the connection,
maintaining a reference count having a value for each connection in order to control connections, on the basis of certain criteria that pertain to the connection handle,
increasing the value of the connection reference count by one unit upon realisation of a first criterion,
reducing the value of the connection reference count by one unit upon the realisation of a second criterion,
releasing the connection and the related connection handle upon the realisation of a third criterion that pertains to the reference count, wherein said third criterion is realized upon the reference count receiving the value zero.

2. A method according to claim 1, wherein the said connection handle is an integer.

3. A method according to claim 2, wherein the connection handle is sent to the protocol layer as a response to a subroutine call made by the said protocol layer.

4. A method according to claim 1, wherein the said value of the reference count is an integer and that the said unit is integer 1.

5. A method according to claim 4, wherein the said first criterion is realised upon the creation of a protocol object for the connection handle.

6. A method according to claim 4, wherein the said second criterion is realised upon the elimination of the protocol object created for the connection handle.

7. A method according to claim 1, wherein the method comprises controlling connections to WAP terminals (Wireless Application Protocol) and wherein the said gateway is a gateway of a WAP system.

8. A gateway (functionally coupled with a radio interface for transmitting messages between a wireless terminal and a server, the gateway having a protocol layer for processing messages, the gateway comprising:
- means for assigning a connection handle to each connection upon the establishment of the connection, in order to identify the connection,
- means for maintaining a reference count having a value for each connection in order to control the connections on the basis of certain criteria that pertain to the connection handle,
- means for increasing the value of the connection reference count by one unit upon realisation of a first criterion,
- means for reducing the value of the connection reference count by one unit upon realisation of a second criterion,
- means for releasing the connection, and the related connection handle upon the realisation of a third criterion that pertains to the reference count, wherein said third criterion is realized upon the reference count receiving the value zero.

9. A computer program product, executable by means of a computer, for controlling connections in a gateway functionally coupled with a radio interface and having means for implementing a certain protocol layer, the computer program product comprising:
- means for assigning a connection handle to each connection upon establishment of the connection, in order to identify the connection,
- means for maintaining a reference count for each connection, the reference count having a value, in order to control the connections on the basis of certain criteria that pertain to the connection handle,
- means for increasing the value of the connection reference count by one unit upon realisation of a first criterion,
- means for reducing the value of the connection reference count by one unit upon realisation of a second criterion,
- means for releasing the connection and the related connection handle upon realisation of a third criterion that pertains to the reference count, wherein said third criterion is realized upon the reference count receiving the value zero.

10. A memory readable by means of a computer, in which memory a computer program has been stored for controlling connections in a gateway functionally coupled with a radio interface and having means for implementing a certain protocol layer, wherein, upon execution of the computer program,
- a connection handle is assigned to each connection upon establishment of the connection, in order to identify the said connection,
- a reference count having a value is maintained for each connection in order to control the connections on the basis of certain criteria that pertain to the connection handle,
- the value of the connection reference count is increased by one unit upon realisation of a first criterion,
- the value of the connection reference count is reduced by one unit upon realisation of a second criterion,
- the connection and the related connection handle are released upon realisation of a third criterion that pertains to the reference count, wherein said third criterion is realized upon the reference count receiving the value zero.

11. A method according to claim 1, wherein the reference count indicates how many protocol layer protocol objects or gateway applications are using the connection in question.

12. A method according to claim 1, wherein a connection handle specific to each connection is sent with a protocol message from said protocol layer to another protocol layer of the gateway to identify a connection.

13. A gateway according to claim 8, wherein the first criterion is realised upon creation of a protocol object for the connection handle.

14. A gateway according to claim 8, wherein the second criterion is realised upon elimination of the protocol object created for the connection handle.

15. A gateway according to claim 8, wherein the third criterion is realised upon the reference count getting the value zero.

16. A gateway according to claim 8, wherein the gateway is a gateway of a WAP system.

17. A gateway according to claim 8, wherein the reference count indicates how many protocol layer protocol objects and/or gateway applications are using the connection in question.

18. A gateway according to claim 8, wherein the gateway comprises means for sending a connection handle specific to each connection with a protocol message from said protocol layer to another protocol layer of the gateway to identify a connection.

* * * * *